United States Patent [19]

Ishida et al.

[11] Patent Number: 5,603,837

[45] Date of Patent: *Feb. 18, 1997

[54] SEPARATION OF A MULTICOMPONENT MIXTURE INTO COMPONENTS THEREOF

[75] Inventors: Masaru Ishida, Yokohama; Takeshi Hatanaka, Kawasaki, all of Japan

[73] Assignee: Soken Kagaku Kabushiki Kaisha, Tokyo, Japan

[ * ] Notice: The term of this patent shall not extend beyond the expiration date of Pat. No. 5,405,534.

[21] Appl. No.: 520,001

[22] Filed: Aug. 28, 1995

Related U.S. Application Data

[63] Continuation of Ser. No. 127,192, Sep. 27, 1993, abandoned.

[30] Foreign Application Priority Data

Sep. 28, 1992 [JP] Japan .................. 4-258546

[51] Int. Cl.⁶ ........................................ C02F 1/42
[52] U.S. Cl. .................. 210/662; 210/672; 210/676; 210/677
[58] Field of Search ................. 210/659, 672, 210/677, 662, 676, 670, 675, 96.1, 264, 267, 269, 284

[56] References Cited

U.S. PATENT DOCUMENTS

| | | | |
|---|---|---|---|
| 2,985,589 | 5/1961 | Broughton et al. | 210/659 |
| 4,402,832 | 9/1983 | Gerhold | 210/659 |
| 4,498,991 | 2/1985 | Oroskar | 210/677 |
| 4,923,616 | 5/1990 | Hirata et al. | 210/676 |
| 5,064,539 | 11/1991 | Tanimura et al. | 210/659 |
| 5,122,275 | 6/1992 | Rasche | 210/659 |
| 5,198,120 | 3/1993 | Masuda et al. | 210/659 |
| 5,223,143 | 6/1993 | Masuda et al. | 210/659 |
| 5,405,534 | 4/1995 | Ishida et al. | 210/662 |

FOREIGN PATENT DOCUMENTS

| | | |
|---|---|---|
| 0179970 | 5/1986 | European Pat. Off. . |
| 0422421 | 4/1991 | European Pat. Off. . |
| 0495640 | 7/1992 | European Pat. Off. . |
| 1946186 | 4/1970 | Germany . |

*Primary Examiner*—Cynthia L. Nessler
*Attorney, Agent, or Firm*—Koda and Androlia

[57] ABSTRACT

A multicomponent mixture is separated into its components by subjecting the multicomponent mixture to a separation means to flow therein, which means comprises a plurality of columns divided into at least three groups wherein each group of columns has the columns which are in the same number as that of the components in the multicomponent mixture and are filled with a adsorbent so that one column has an adsorbent specific to either one of the components; wherein the three groups are respectively assigned to fractionation in a fractionation zone, to purification in a purification zone and to desorption in a desorption zone; the groups of columns are switched from zone to zone; and the effluent from the columns used in the fractionation zone is sent to the columns in the purification zone which have once been used in the fractionation zone and the columns in the purification zone are then assigned, upon the switching, to desorption.

9 Claims, 10 Drawing Sheets

5,603,837

SEPARATION OF A MULTICOMPONENT MIXTURE INTO COMPONENTS THEREOF

This is a continuation of application Ser. No. 08/127,192, filed Sep. 27, 1993, now abandoned.

BACKGROUND OF THE INVENTION

1. Field of the Invention

This invention relates to separation of a multicomponent mixture into the components thereof by means of adsorption.

More specifically, the present invention relates to a method and to an apparatus for separation of a multicomponent mixture into the components thereof by means of adsorption where use is made of a plurality of columns each having an adsorbent packed therein which is capable of selectively adsorbing each of the component and where an effluent from one of the columns is used as a fluid for purifying the adsorbate in another column whereby separation of the components is made by a desorbent in a minimum amount so that each adsorbate is desorbed in a higher concentration, in a higher purity and in a higher recovery efficiency.

2. Related Art

Heretofore, techniques such as gas chromatography and liquid chromatography utilizing the difference in distribution coefficient against adsorbents have been known as means for separating and purifying components in a multicomponent mixture.

These separation/purification means have excellent separation ability and therefore they have been widely used in chemical analysis of complex mixtures. However, when these means are used as separation/purification means on an industrial scale, the purification cost is high due to batch operation. Accordingly, the application fields of such means are limited. In addition, the components separated as adsorbates may not be recovered since they are small in quantity whereby the separation of components through adsorption may have thus been used solely as a means for chemical analysis.

On the other hand, in a pseudo-moving bed adsorption separation apparatus wherein continuous operation is used on an industrial scale such as continuous separation apparatus described in U.S. Pat. No. 2,985,589, a mixture containing 2 components is separated. However, it may, as long as we know, be difficult to continuously separate a mixture containing at least 3 components by a single apparatus.

In a process for continuously separating 3 components by a pseudo-moving bed adsorption separation apparatus recently proposed in Japanese Patent Laid-Open Publication No. 80409/1989, the separation has been realized by alternately disposing a column packed with a first packing wherein its distribution coefficient against Components A, B and C is Component A<Component B<Component C and a column packed with a second packing wherein its distribution coefficient is Component A<Component C<Component B and flowing the solution through the columns.

However, these methods may be restricted to operations in that fluid flows through each column and one-column based operation may decrease an efficiency in returning an effluent from a column to another column, a long time may be needed until stabilization of operations is reached and a long time may also be required until the amount and purity of an adsorbate reach at an elevated level. These methods could, as long as we know, entail increase in cost or difficulty in their applicability to operation in a small quantity.

We have also proposed a method of separation in Japanese Patent Application No. 15882/1991, which is equivalent to U.S. patent application Ser. No. 114,331. Our method proposed is assumed to be improved over some of the prior art method, but would be further improved if the amount of a desorbent is decreased. More particularly, the method we proposed may require a relatively large amount of a desorbent, whereby a relatively large volume of an apparatus for practicing the method may be required resulting in relatively large amounts of a facility cost and of a running cost.

SUMMARY OF THE INVENTION

The present invention is to provide a method of separation of multicomponent mixture into the components by means of selective adsorption wherein use is made of a plurality of columns having a solid adsorbent packed therein, which method requires an adsorbent in a minimum quantity.

The present invention is based on our discovery that unique arrangements of columns having a solid adsorbent therein and unique operation of the columns make it possible to skillfully fractionate a multicomponent mixture into the components.

The present invention, in one aspect thereof, provides the improvement in a process for separation of a multicomponent mixture into its components to be separated comprising subjecting a mixture containing components in a number of n to adsorption thereof onto a solid adsorbent packed in a plurality of columns wherein the difference in the degree of being adsorbed of the components is utilized for the separation, the improvement which comprises the steps of:

introducing the multicomponent mixture to a separation means to flow therein which comprises a plurality of the columns and is divided into at least 3 groups for making a fractionation zone which is for fractionation of the mixture into each of the components adsorbed in each of the columns due to the difference in the degree of being adsorbed of the components, wherein each component adsorbed in a given column is still contaminated with other components staying in the column in question, a purification zone which is for purifying each of the contaminated components respectively adsorbed in each of the columns by introducing into each of the columns a medium for purification which can sweep the contaminant components off in each column while the component to be purified may remain adsorbed, and a desorption zone which is for desorbing the component adsorbed in each column by introducing a desorbent to each column thereby to obtain each component purified out of each respective column; each zone comprising a group of columns in a number of n where each of the columns has an adsorbent which selectively adsorbs either one of the components and the group of columns in the given zone being the same as those in the other zones; the group of columns assigned to the fractionation being such that the fractionation zone comprises groups of columns in a number which corresponds to the number of the components to be separated minus unity, viz. n–1, and the most upstream group of columns receives the multicomponent mixture so that every column in the group receives the multicomponent mixture and the groups of columns are connected so that an effluent from each column of an upstream group of columns is sent to the column in a subsequent group of the columns, the latter column having an adsorbent packed therein which is different from that used in the column from which the effluent has come, thereby to produce effluents each containing substantially solely each component of the components in the multicomponent mixture, the other components having been adsorbed in the column or columns through which the multicomponent mixture has been passed; the group of columns assigned to the purification being such that the columns are connected with those in the most downstream group of columns assigned to the fractionation so that an effluent from each column of the fractionation zone, which effluent contains substantially solely one of the components, is sent to the column which has packed therein an adsorbent which selectively adsorbs the particular component in the effluent in question whereby the particular component in the effluent in question is adsorbed in the particular column and the effluent in question is utilized as a purifying fluid for the column in question in the purification zone so that other components in the multicomponent mixture are swept thereby and the column in question in the purification zone has the component selectively adsorbed therein; the group of columns assigned to the desorption being such that the columns respectively receive a desorbent specific to the adsorbate in the given column to desorb the desorbate which is the particular component; the group of columns used in the fractionation being assigned, upon substantial fractionation having taken place, to the purification and then, upon substantial purification having taken place, to the desorption while the groups of columns used in the purification and in the desorption being sent, upon substantial purification and substantial desorption respectively having taken place, to the desorption and the fractionation, respectively, and then, upon substantial desorption and substantial fractionation respectively having taken place, to the fractionation and purification, respectively; the change of assignment being conducted by moving each group of columns for the fractionation, for purification and for desorption from zone to zone so that each group of columns may receive the assignment as indicated and/or by switching flow of fluids between columns so that the columns may receive the assignment as indicated;

subjecting the multicomponent mixture introduced in the most upstream group of columns in the fractionation zone to fractionation wherein the components in the multicomponent mixture are respectively adsorbed in each of the columns and then to subsequent fractionation in each of the columns in the subsequent group or groups of columns so that effluents are obtained each of which contains substantially solely either one component of the components to be separated in the multicomponent mixture, while each effluent from each column of the most downstream group of columns for the fractionation is introduced to each of the columns in the purification zone so that the effluent which contains a particular component is introduced to the column which has an adsorbent that selectively adsorbs the particular component in question so that selective adsorption of the particular component in question and sweeping the contaminant components which may remain in the column in question take place whereby purification of the particular component adsorbed takes place;

assigning the most upstream group of columns used in the fractionation to the purification;

assigning the group of columns used in the purification, wherein each column has each component adsorbed therein and thus purified, to the desorption wherein a desorbent is introduced to each column so as to desorb the component adsorbed in each column thereby to obtain each component from each column of the group of columns used in the desorption.

The present invention, in another aspect thereof, provides an apparatus for separating a multicomponent mixture into its components which comprises a plurality of the columns and is divided into at least 3 groups for making a fractionation zone which is for fractionation of the mixture into each of the components adsorbed in each of the columns due to the difference in the degree of being adsorbed of the components, wherein each component adsorbed in a given column is still contaminated with other components staying in the column in question, a purification zone which is for purifying each of the contaminated components respectively adsorbed in each of the columns by introducing into each of the columns a medium for purification which can sweep the contaminant components off in each column while the component to be purified may remain adsorbed and which is an effluent from another column containing substantially solely a particular component in question, and a desorption zone which is for desorbing the component adsorbed in each column by introducing a desorbent to each column thereby to obtain each component purified out of each respective column; each zone comprising a group of columns in a number of n where each of the columns has an adsorbent which selectively adsorbs either one of the components and the group of columns in the given zone being the same as those in the other zones; the group of columns assigned to the fractionation being such that the fractionation zone comprises groups of columns in a number which corresponds to the number of the components to be separated minus unity, viz. n−1, and the most upstream group of columns receives the multicomponent mixture so that every column in the group receives the multicomponent mixture and the groups of columns are connected so that an effluent from each column of an upstream group of columns is sent to the column in a subsequent group of the columns, the latter column having an adsorbent packed therein which is different from that used in the column from which the effluent has come, thereby to produce effluents each containing substantially solely each component of the components in the multicomponent mixture, the latter components having been adsorbed in the column or columns through which the multicomponent mixture has been passed; the group of columns assigned to the purification being such that the columns are connected with those in the most downstream group of columns assigned to the fractionation so that an effluent from each column of the fractionation zone, which effluent contains substantially solely one of the components, is sent to the column which has packed therein an adsorbent which selectively adsorbs the particular component in the effluent in question whereby the particular component in the effluent in question is adsorbed in the particular column and the effluent in question is utilized as a purifying fluid for the column in question in the purification zone so that other components in the multicomponent mixture are swept thereby and the column in question in the purification zone has the component selectively adsorbed therein; the group of columns assigned to the desorption being such that the columns respectively receive a desorbent specific to the adsorbate in the given column to desorb the desorbate which is the particular component; the group of columns used in the fractionation being assigned, upon substantial fractionation having taken place, to the purification and then, upon substantial purification having taken place, to the desorption while the groups of columns used in the purification and in the desorption being sent, upon substantial purification and substantial desorption respectively having taken place, to the desorption and the fractionation, respectively, and then, upon substantial desorption and substantial fractionation respectively having taken place, to the fractionation and purification, respectively; the change of assignment being conducted by moving each group of columns for the fractionation, for purification and for desorption from zone to zone so that each group of columns may receive the assignment as indicated and/or by switching flow of fluids between columns so that the columns may receive the assignment as indicated.

1: an apparatus for separation of a multicomponent mixture into the components;

2: columns;

2A: a first column for selectively adsorbing a component A in the multicomponent mixture;

2B: a second column for selectively adsorbing a component B in the multicomponent mixture;

3: a fractionation zone;

3a: a first fractionation zone;

3b: a second fractionation zone;

3c: a fractionation/recovery zone;

4: a purification zone;

5: a desorption zone;

6: groups of columns;

7a, 7b, 7c: tubes between the groups of columns;

8a, 8b: tubes between the zones;

9: a desorbent;

10a, 10b: tubes for introducing a desorbent;

11: a feed of the multicomponent mixture;

12a, 12b: tubes for introducing the feed;

13: a means for switching the group of columns from zone to zone;

15: a three-way valve;

16: an on-off valve;

17a, 17b: tubes for sending an effluent back;

18: a tube for introducing a purifying medium;

A: a component A;

B: a component B;

C: a component C; and

D: a desorbent.

DETAILED DESCRIPTION OF THE PREFERRED EMBODIMENTS

The present invention will be described in more detail with respect to the preferred embodiments thereof, where it is assumed that the present invention will be better understood if reference is made first to an apparatus used.

Figure 1:
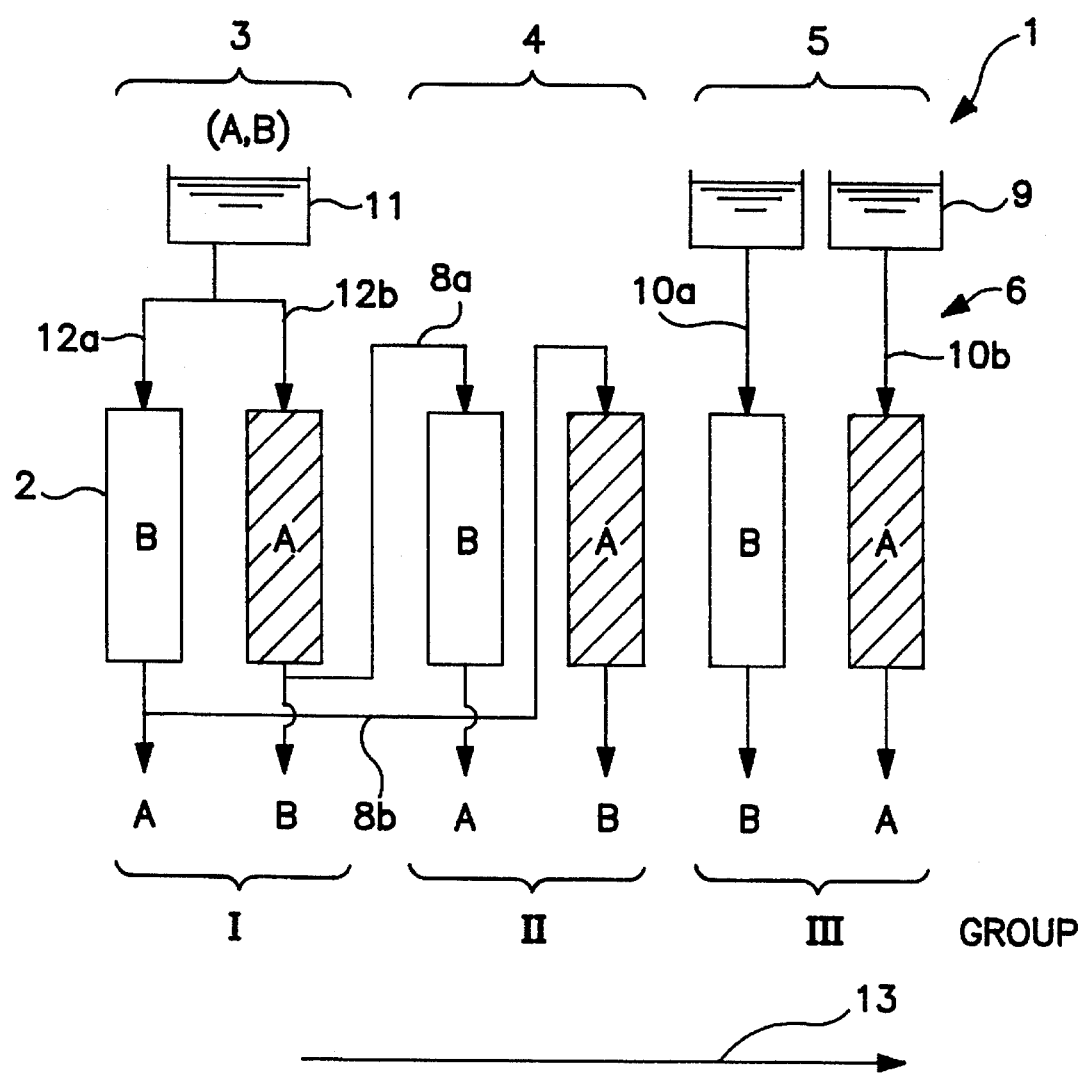
FIG. 1 is a basic flow diagram for separation of two components in a multicomponent mixture in accordance with the present invention where three groups of columns are comprised as a fractionation zone, a purification zone and a desorption zone, respectively, and each group has two columns, six columns in total.

[I] An apparatus for separation of a multicomponent mixture into its components (1) Structure The apparatus in accordance with the present invention basically comprises, as shown in FIG. 1, groups of columns 6, tubes for introducing a feed of a multicomponent mixture 12a and 12b, tubes between the groups of columns 7a and 7b, tubes between the zones 8a and 8b, tubes for introducing a desorbent 10a and 10b, and a means 13 for switching the group of columns from zone to zone.

The groups of columns 6 are characterized in that each column in a given group has a solid adsorbent packed therein which selectively adsorbs specific one of the components to be separated and each group is thus made up with columns in a number which corresponds to the number of the components to be separated, viz. n, and in that the groups of columns are classified into at least three zones comprising a fractionation zone where the multicomponent mixture is fractionated roughly into each of the components so that a particular component is selectively adsorbed on an adsorbent in a column which is specific to the particular component in question, a purification zone where an adsorbate which is a particular component adsorbed is purified by a purifying fluid which is an effluent from one of the columns of the fractionation zone thereby to sweep contaminant components in the given column off the column in question while the adsorbate remains adsorbed, and a desorption zone where the adsorbate in the given column in the purification zone is desorbed by a desorbent flown therethrough.

The numbers of the group of columns for the purification zone and the desorption zone are respectively at least one (1), but the number of the group of columns for the fractionation zone is at least a number which corresponds to the number of the components to be separated, viz. n, minus unity, viz. n–1.

Accordingly, when a multicomponent mixture is to be separated into two components, A and B, use is made of an apparatus shown in FIG. 1 which comprises groups of columns 2A and 2B wherein column 2A has an adsorbent packed therein which selectively adsorbs one of the two components, viz. A, and column 2B has an adsorbent packed therein which selectively adsorbs the remaining component, viz. B, and the groups of columns are arranged in at least 3 zones, viz. a fractionation zone 3, a purification zone 4 and a desorption zone 5. The number of the group of columns for the fractionation zone, which is unity (1) in this embodiment, corresponds to n–1 where n is a number of components to be separated, viz. 2 in this embodiment. In this particular embodiment, 3 groups of columns each consisting of 2 columns wherein a total amount of columns is 6 are used.

Figure 2:
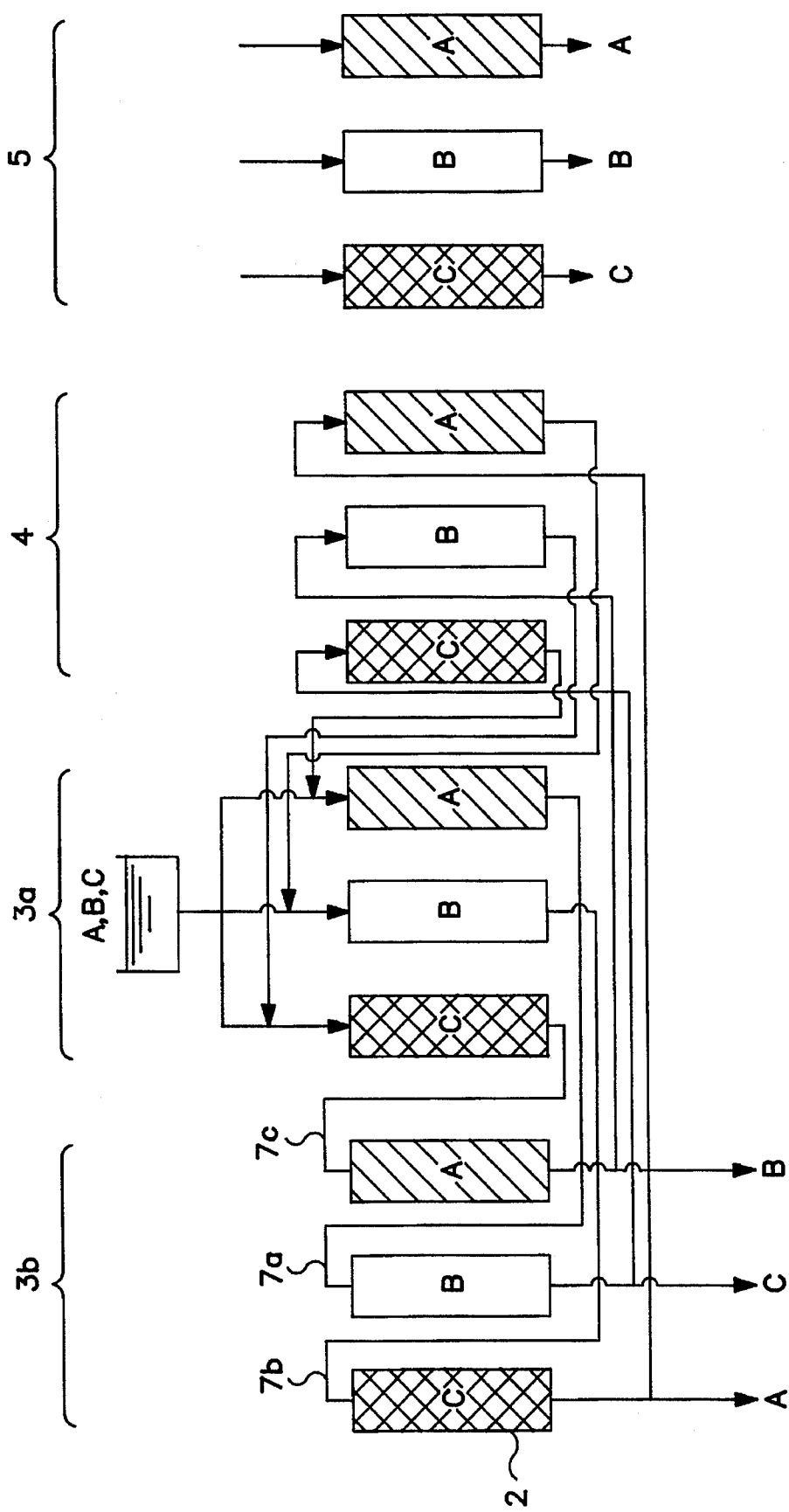
FIG. 2 is a flow diagram for separation of three components in a multicomponent mixture in accordance with the present invention where four groups of columns are comprised as a fractionation zone with two groups of columns constituting a first fractionation zone and a second fractionation zone, respectively, a purification zone and a desorption zone, respectively, and each group has three columns, and an effluent from the purification zone is sent back to the first fractionation zone.
Figure 3:
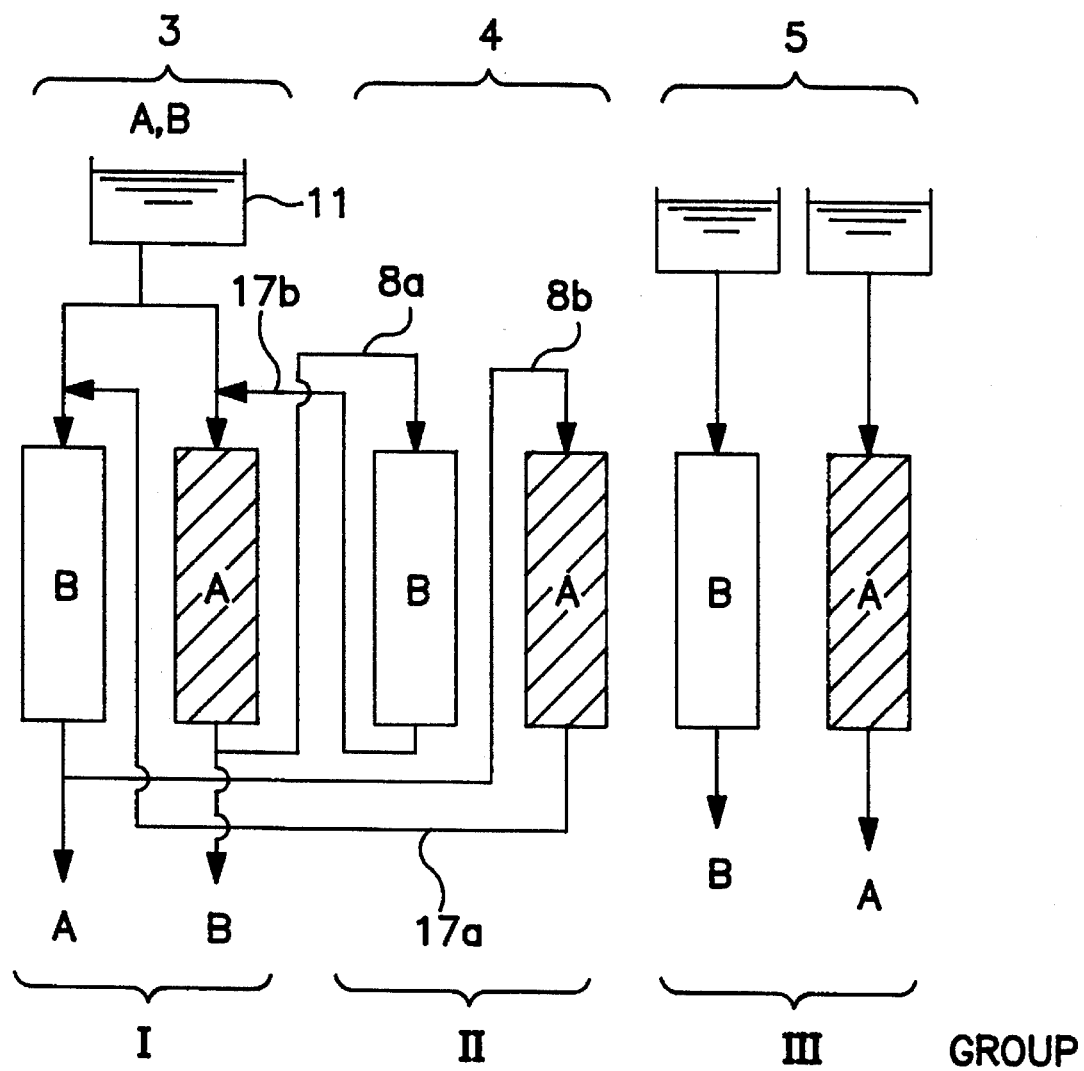
FIG. 3 is an improvement to the basic flow diagram of FIG. 1 where an effluent from the purification zone is sent back to the fractionation zone.

When a multicomponent mixture is to be separated into three components, A, B and C, n thus being 3, use is made of an apparatus shown in FIG. 2 which comprises groups of columns, 2A, 2B and 2C, wherein column 2A has an adsorbent packed therein which selectively adsorbs the component A, column 2B has an adsorbent packed therein which selectively adsorbs the component B and column 2C has an adsorbent packed therein which selectively adsorbs the component C, and the groups of columns are arranged in at least 3 zones, viz. a fractionation zone 3, a purification zone 4 and a desorption zone 5. In this embodiment, two groups of columns are assigned to fractionation, wherein the number of groups, viz. 2, corresponds to n–1 where n is 3 in this embodiment. In this particular embodiment, 4 groups of columns each consisting of 3 columns wherein a total amount of columns is 12 are used.

In these embodiments in FIG. 1 and FIG. 2, the apparatus further comprises tubes 12a and 12b (FIG. 1) for introducing the feed 11 in a parallel manner to columns in the most upstream group of columns in the fractionation zone 3, tubes 7a, 7b and 7c (FIG. 2) for connecting one group of columns to another group of columns wherein columns are connected between the groups in a parallel manner in that an effluent from a column in a given group of columns is sent to a column in another group of columns and the columns in question are different from each other in the type of an adsorbent packed therein, e.g. from column A in the zone 3a to column B in zone 3b in FIG. 2. The parallel flow principle applies between any zones where such connection between columns is concerned as in FIG. 2, between the zone 3a and the zone 4.

In these embodiments in FIG. 1 and FIG. 2, the apparatus still further comprises tubes 8a and 8b (FIG. 1) for feeding an effluent from a given column in the fractionation zone to a column in the purification zone in a parallel manner where the definition of "parallel manner" referred to hereinabove applies here so that the effluent which contains components that have not been adsorbed in the column in question, viz. the component B when the effluent comes from the column 2A of the fractionation zone 3 where the column 2A selectively adsorbs the component A, leaving the component B in the effluent, is sent through the tube 8a not to a column 2A but to a column 2B in the purification zone 4.

The apparatuses shown in FIG. 1 and FIG. 2 of a fundamental structure or flow diagram also comprise tubes 10a and 10b (FIG. 1) for introducing a desorbent 9 which is specific to the respective adsorbates in the columns of the desorption zone 5.

Last but not least, the apparatuses of a fundamental structure shown in FIG. 1 and FIG. 2 comprises a means 13 for switching the group of columns from zone to zone, which is a mechanical means for moving a group of columns from zone to zone and/or a valving means for switching flows between columns so that switching of a group of columns from zone to zone is established.

(2) Elements of the apparatus (a) Columns

A plurality of groups of columns 2A, 2B . . . is used in the apparatus in accordance with the present invention.

It is essential to the present invention to use columns respectively having an adsorbent packed therein, which adsorbent selectively adsorbs either one of the components in that column 2A selectively adsorbs component A, column 2B selectively adsorbs component B, and so on.

Accordingly, the number of columns in a group of columns is the same as that of the components to be separated.

In other words, when a multicomponent mixture 11 is to be separated into two components, viz. A and B, at least two columns, viz. 2A and 2B, are comprised in each group of columns, or when a multicomponent mixture 11 is to be separated into three components, viz. A, B and C, at least three columns, viz. 2A, 2B and 2C, are comprised in each group of columns, and the groups of columns are assigned to fractionation, purification and desorption in at least 3 zones, viz. a fractionation zone, a purification zone and a desorption zone, respectively, to form groups of column 6.

FIG. 1 shows an embodiment of the present invention where a multicomponent mixture 11 has two components. The embodiment has a fractionation zone 3, a purification zone 4 and a desorption zone 5, and each zone comprises at least two columns, viz. 2A and 2B, whereby the group of columns 6 comprises 6 columns.

Figure 8:
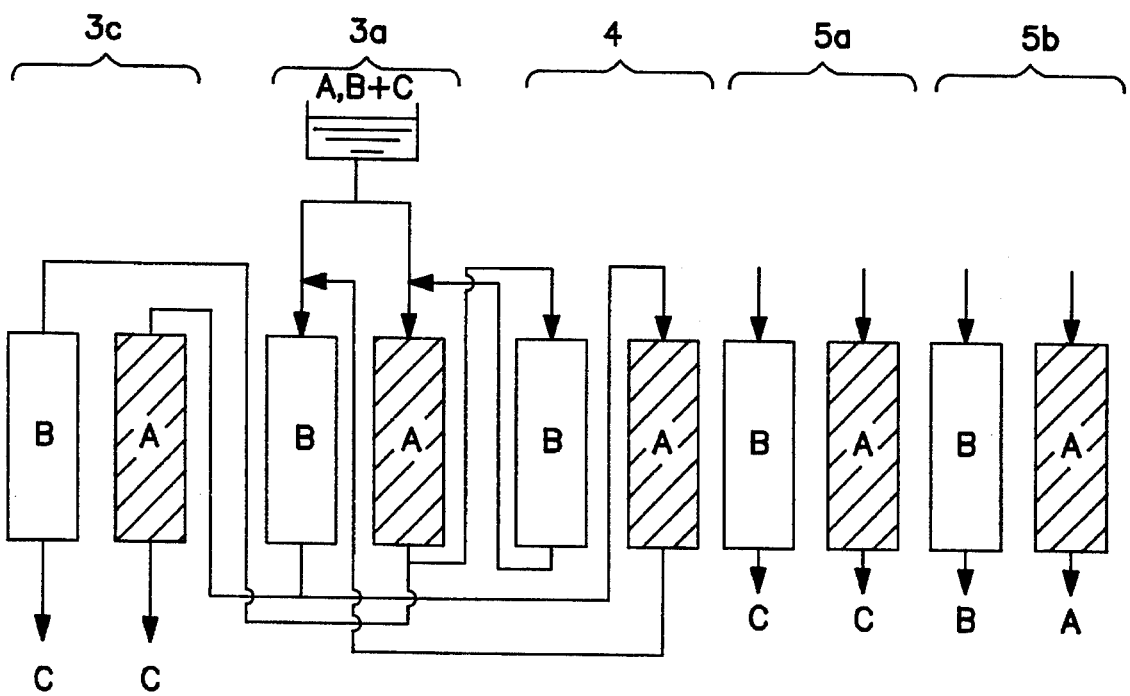
FIG. 8 is a flow diagram for separation of components where only two components among three components are separated.

The fundamental or basic structure 1 shown in FIG. 1 can be modified as shown in FIG. 2 so that the fractionation zone 3 comprises at least two groups of columns of a first fractionation zone 3a and a second fractionation zone 3b, or the purification zone 4 comprises at least two groups of columns, viz. a first purification zone 4a and a second purification zone 4b, or as shown in FIG. 8 the desorption zone 5 comprises at least two groups of columns, viz. a first desorption zone 5a and a second desorption zone 5b.

Figure 4:
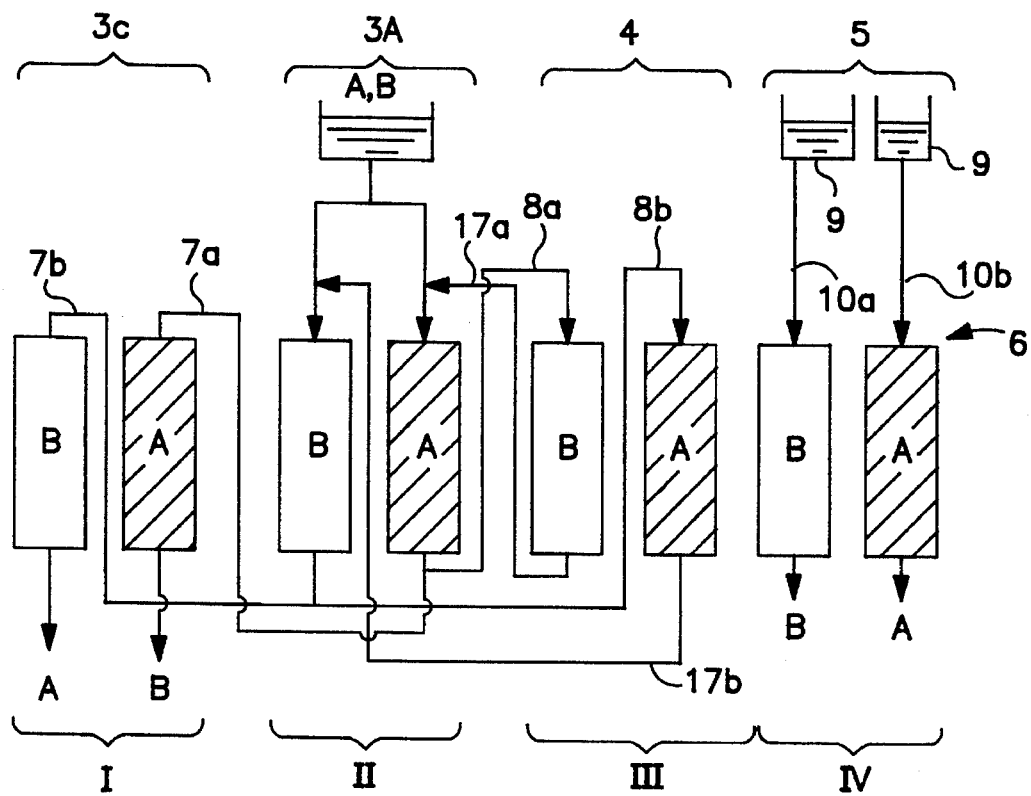
FIG. 4 is a diagrammatic indication of how the separation of components is operated in accordance with the present invention where use is made of four groups of columns consisting of a fractionation/recovery zone (1), a first fractionation zone (2), a purification zone (3) and a desorption zone (4), each zone having two columns, and where the groups of columns are sequentially switched from zone to zone.
Figure 4:
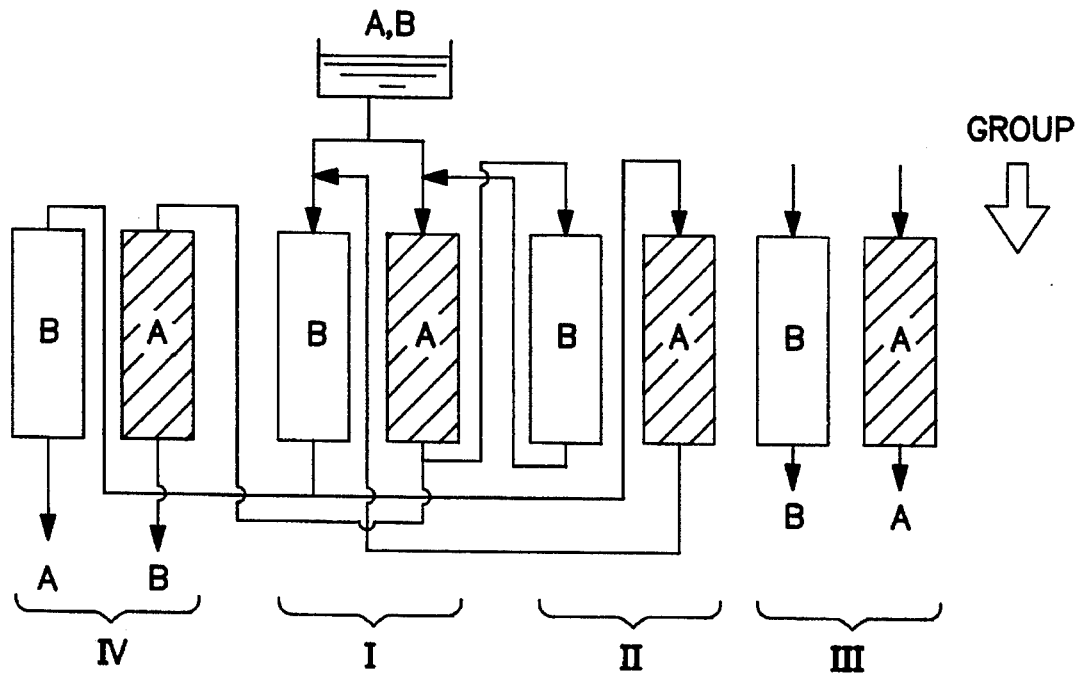
Figure 4:
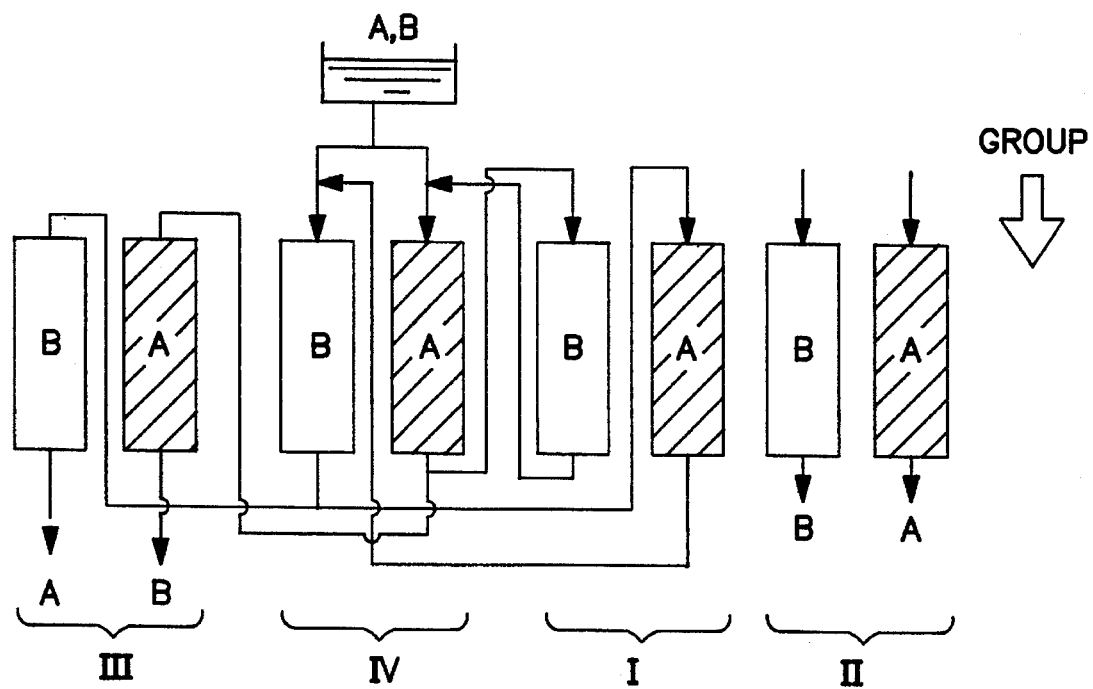
Figure 4:
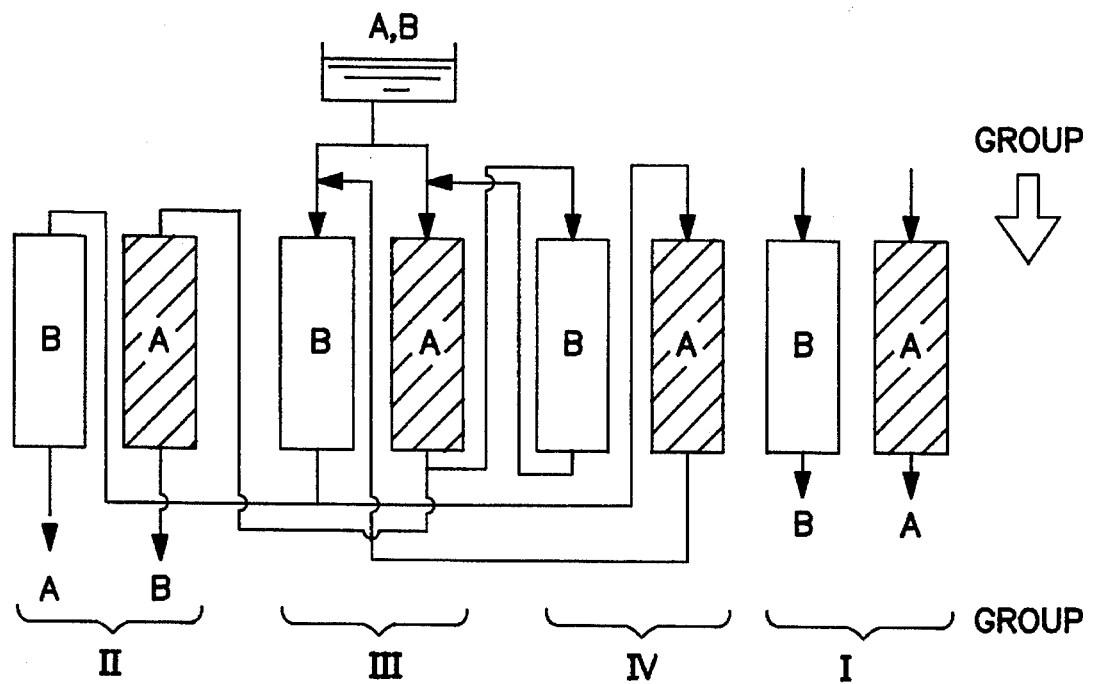

More particularly, as shown in FIG. 4, a fractionation zone 3 comprises at least two groups of columns and the purification zone 4 comprises one group of columns whereby an apparatus comprises 4 groups of columns, viz. a fractionation/recovery zone 3c, a first fractionation zone 3a, a purification zone 4, and a desorption zone 5, each zone having two columns, viz. 2A and 2B, the apparatus thus comprising 8 columns to form a group of columns 6.

Figure 5:
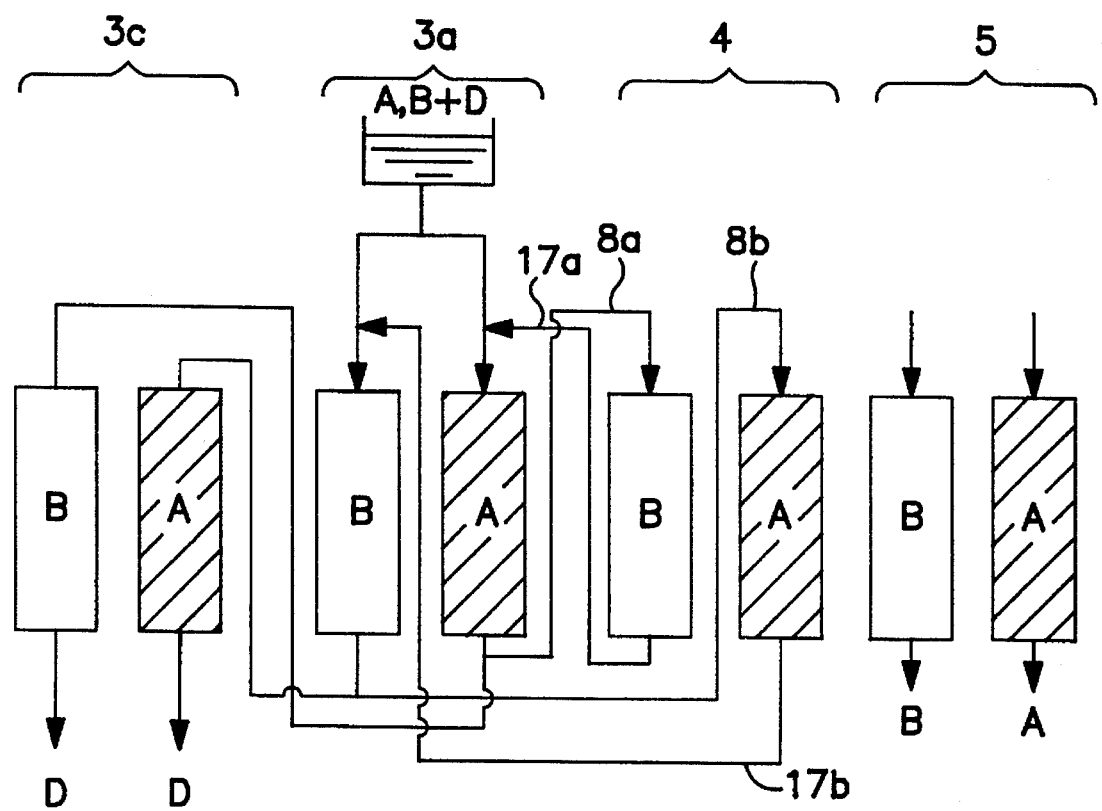
FIG. 5 is a flow diagram in separation of components in accordance with the present invention where a desorbent used is recovered.

Provision of a fractionation/recovery zone 3c will make it possible, as shown in FIG. 5, to recover only a desorbent used, viz. component D, at the fractionation/recovery zone 3c.

(b) Tubes between groups of columns

A group of columns 2A and 2B in a fractionation zone 3 and that in a purification zone 4 are connected in each group of columns in a parallel manner and by means of tubes 7a, 7b and 7c (FIG. 2).

More particularly, the tubes 7a, 7b and 7c for flows between groups of columns in the fractionation zone 3 are so arranged that an effluent coming from, e.g. column A in one group of columns runs into a column having an adsorbent which selectively adsorbs the component other than, e.g. component A, in another group of columns, such as column B where the component B is selectively adsorbed, as shown in an embodiment of FIG. 2 wherein an effluent coming from a column 2A in the group of columns in the fractionation zone 3a will be sent to through the tube 7a to the column 2B in the group of columns in the fractionation zone 3b, resulting in the situation that the component A is adsorbed in the column A in the zone 3a and the component B which has passed through the column A in the zone 3a is adsorbed in the column B in the zone 3b, the effluent thus comprising C.

(c) Tubes between the zones

Connections between columns 2A and 2B in the fractionation zone 3 and columns 2A and 2B in the purification zone 4 are made by tubes between the zones 8a and 8b (FIG. 1).

The tubes between the zones 8a and 8b are for sending an effluent from e.g. column A which contains a non-adsorbed component, viz. component B, to a column in the purification zone in a parallel manner, namely to the column B, wherein the effluent functions as a purifying fluid in the column B thereby to increase the purity of the component B adsorbed and expel other components which would have been brought into the column. Similarly, an effluent coming from the column 2B in the fractionation zone 3 which contains the component A that has not been adsorbed in the column B is sent to the column 2A in the purification zone.

(d) Tubes for sending back effluents

Between the fractionation zone 3 and the purification zone 4, tubes 17a and 17b can upon necessity be provided as shown in FIGS. 2, 3, 4 and 5 for sending effluents from the columns 2A and 2B in the purification zone 4 back to the tops of the columns 2B and 2A in the fractionation zone 3 in the parallel manner, in order to increase capacity of separation. The tubes 17a and 17b for sending back or refluxing effluents are kind of tubes 8a and 8b between the zones, but may be taken as being slightly different therefrom in view of the facts that flows of fluid running therethrough are in reverse direction and that use of the refluxing tubes is for increasing separation efficiency.

Figure 7:
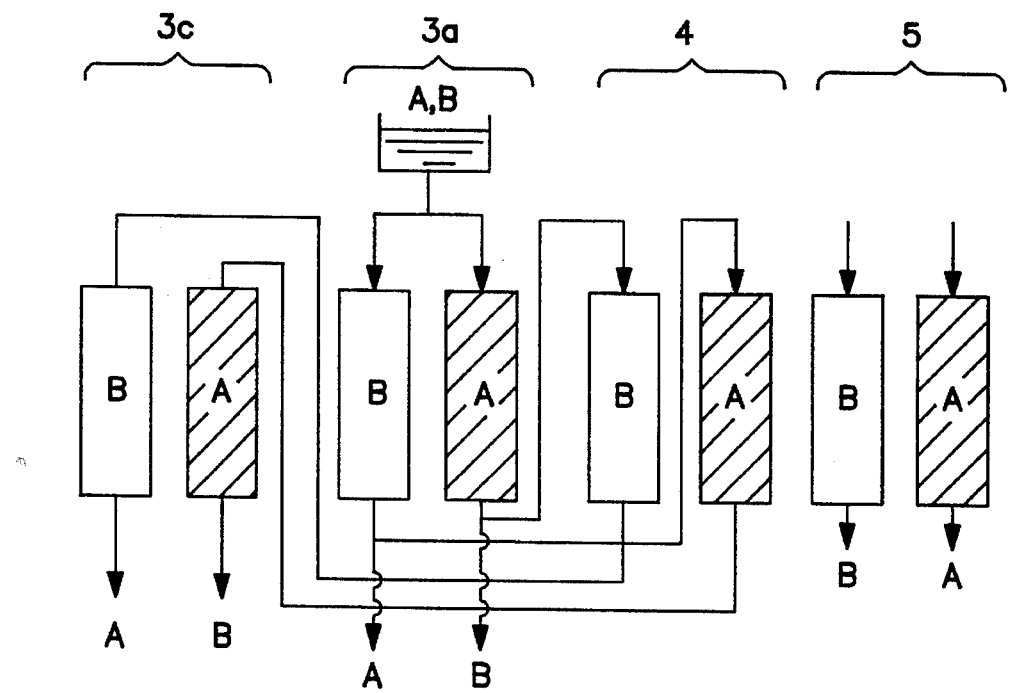
FIG. 7 is a flow diagram for separation of components in accordance with the present invention where use is made of four groups of columns consisting of a fractionation/recovery zone, a first fractionation zone, a purification zone and a desorption zone, and where an effluent from the purification zone is sent back to the fractionation/recovery zone.

The refluxing from the purification zone 4 to the fractionation zone 3 can also be conducted so that the effluent from the purification zone 4 is sent skipping over the first fractionation zone 3a directly to the fractionation/recovery zone 3c as shown in FIG. 7.

(e) Tubes for feeding a multicomponent mixture

Tubes 12a and 12b (FIG. 1) are provided at the tops of a column 2A and a column 2B of the most upstream group of columns placed in the fractionation zone 3 for feeding a multicomponent mixture to each of the columns 2A and 2B.

The multicomponent mixture 11 can be fed to the columns continuously or intermittently.

(f) Tubes for feeding a desorbent

Tubes 10a and 10b (FIG. 1) are provided for feeding a desorbent 9 to the columns of a group of columns placed in the desorption zone for desorbing the particular component adsorbed in the particular column which has been accumulated through the steps of fractionation and purification which a given group of columns has undergone due to the switching of groups of columns from zone to zone which will be described in more detail.

The desorbent can be of any material as long as it desorbs the particular adsorbate in question. The desorbent can be fed in the desorption zone continuously or intermittently.

(g) Switching of groups of columns from zone to zone

One of the important features of the present invention is to sequentially switch groups of columns from zone to zone.

More particularly, in a fundamental or basic arrangement of columns where a group of columns is assigned to fractionation, another group of columns is assigned to purification and still another group of columns is assigned to desorption, the groups of columns being identical with each other in the type of adsorbents housed in the columns and in the number of columns, the three groups of columns assigned respectively to fractionation, to purification and to desorption in a fractionation zone, in a purification zone and in a desorption zone, respectively, are switched, after operation for a certain period of time so that the group of columns once assigned to fractionation is then assigned to purification, the group of columns once assigned to purification is then assigned to desorption and the group of columns once assigned to desorption is then assigned to fractionation. For instance, the group of columns which has undergone fractionation so that each of the components has been adsorbed in each pertinent column with some of other components unadsorbed in the given column is then assigned to purification whereby each of the adsorbates receives purification. In the same way, the group of columns which has undergone purification so that the amount of components as an adsorbate in each column is now at the highest levels of purity and content possible is then assigned to desorption whereby the components separately adsorbed in each column are then desorbed. The group of columns having undergone desorption and thus assuming the quasi-virgin state is then assigned to fractionation, and the cycle of operation is completed.

The switching of the groups of columns of this nature will be shown in FIG. 4, where the sequence of the switching is indicated by the stages (1), (2), (3) and (4).

The embodiment shown in FIG. 4 is a modification of the fundamental or basic structure given above in that a fractionation/recovery zone 3c is provided such (i) that the group of columns assigned to fractionation/recovery is connected with the group of columns assigned to fractionation in a series manner, namely the effluent from column A of the group of columns assigned to fractionation in fractionation zone 3a is sent via tube 7a (FIG. 4) to the top of column A of the group of columns assigned to fractionation in the fractionation/recovery zone 3c and, similarly, the effluent from column B in the fractionation zone 3a is sent via tube 7b (FIG. 4) to the top of column B in the fractionation/recovery zone 3c, and (ii) that effluents from the columns in the group of columns assigned to fractionation/recovery are recovered as the component B from the column A and the component A from the column B In the embodiment shown in FIG. 4(1), (2), (3) and (4), the apparatus or flow diagram comprises four groups of columns 2A and 2B, groups I, II, III, and IV, which are assigned to fractionation/recovery, viz. zone 3c, first fractionation, viz. zone 3a, purification, viz. zone 4, and desorption, viz. zone 5, and the groups of columns are switched by a means for switching the groups of columns from zone to zone.

Figure 6:
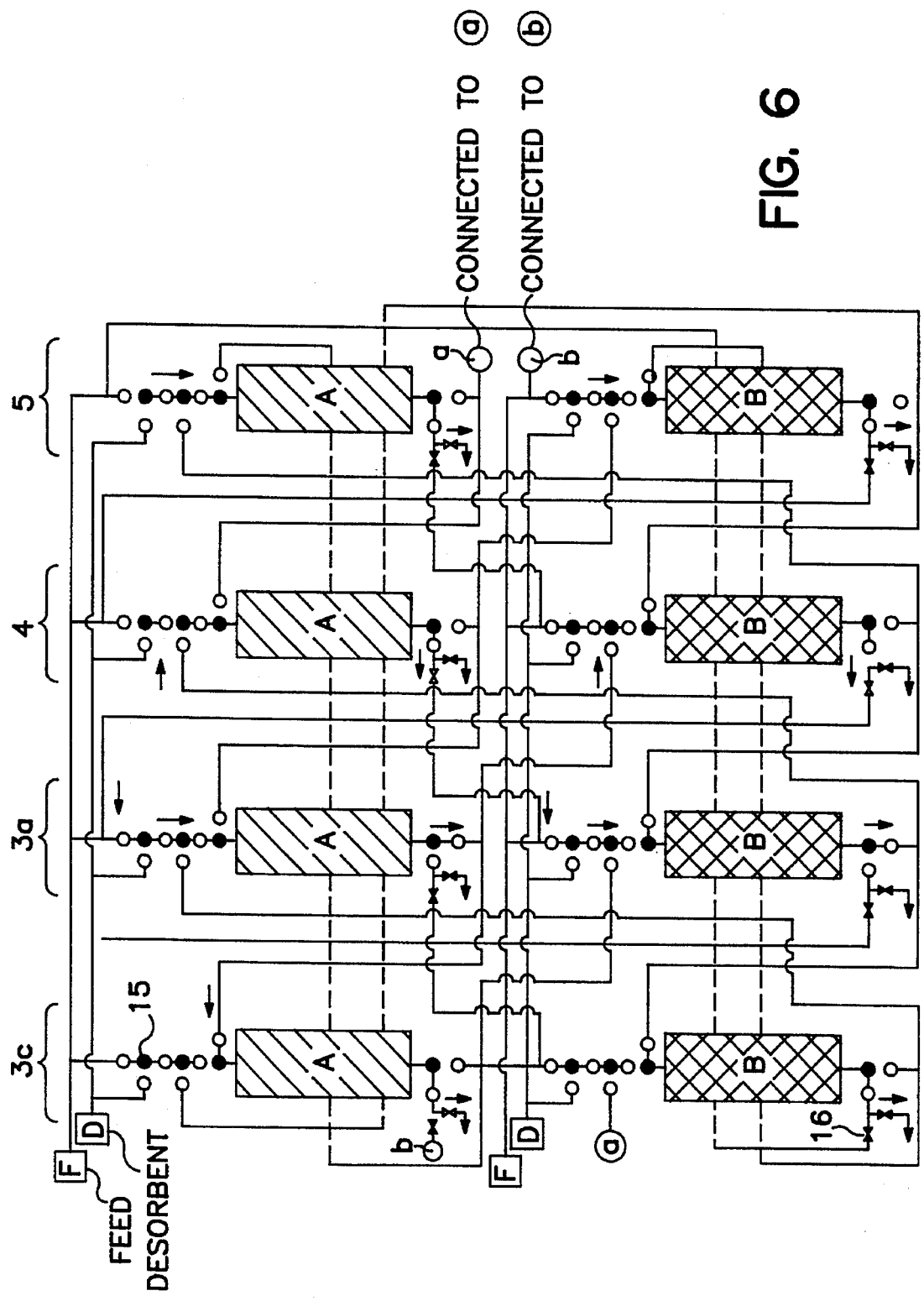
FIG. 6 is a flow diagram for separation of components in accordance with the present invention where use is made of four groups of columns consisting of a fractionation/recovery zone, a first fractionation zone, a purification zone and a desorption zone, each zone having two columns, and where each of flows is controlled by means of pertinent valves.

The means for switching the groups of columns from zone to zone may be a mechanical means for moving the groups of columns from zone to zone, or may be a valving means, as shown in FIG. 6, for switching flows between columns and/or groups of columns by a three-way valve or an on-off valve, or may be any combination of these two means.

[II] Multicomponent mixture

Multicomponent mixtures to be separated into their components 11 may be those comprising at least 2 components, or typically 2 to 10 components. Multicomponent mixtures comprising 2–5 components are preferable, and those comprising 2–3 components are more preferable in that the advantages inherent in the present invention are obtainable at the highest level possible.

Particular examples of separation of these mixtures into their components include desalting of materials containing a salt as a contaminant, separation of chiral mixtures, separation of physiologically active substances from each other or from solutions comprising them, and separation of proteins from each other or from solutions containing them.

[III] Separation (1) Fractionation zone

Separation of multicomponent mixtures into their components in accordance with the present invention may require, even in the most simplified embodiment, an apparatus or flow diagram as set forth in FIG. 1.

The present invention will be described in more detail in respect of how separation is conducted with reference to FIG. 1 where two components are separated from each other. Separation of more than two components will require more columns in a group of columns and more such groups, but the principle of separation embodied in the embodiment of FIG. 1 will apply even to such rather complex structure of apparatus or flow diagram.

A multicomponent mixture which is two-component mixture in this particular example is fed to column 2A and column 2B of the most upstream group of columns, which is that placed in a first fractionation zone 3a in FIG. 4.

In feeding the two-component mixture to the columns 2A and 2B in the first fractionation zone 3a, it is preferable as shown in FIG. 4 to make up a feed wherein the two-component mixture is admixed respectively with effluents from columns 2A and 2B of the group of columns placed in a purification zone 4 in a parallel manner, viz. the effluent from column A in the purification zone sent to column B in the fractionation zone 3, or 3a in FIG. 4, and, similarly, the effluent from the column 2B is sent to the column 2A in the zone 3a.

The two-component mixture fed respectively to the columns A and B in the fractionation zone 3, or 3a in FIG. 4, undergoes selective adsorption in each of the columns which contains an adsorbent specific to the component A in the column A and which contains an adsorbent specific to the component B in the column B, whereby the effluent from the column 2A, for instance, contains only the component B with no content of the component A.

The effluent from the column 2B is also characterized by its sole content of the component A since the column 2B has selectively adsorbed the component B.

The effluents from the columns 2A and 2B in the fractionation zone 3, or 3a in FIG. 4, will then be sent to the purification zone 4 in a parallel manner so that the effluent from the column 2A is sent via a tube between the zones 8a to the column 2B in the purification zone 4, and, similarly, the effluent from the column 2B is sent via a tube between the zones 8b to the column 2A in the purification zone 4, the columns 2A and 2B being distinct from each other, as set forth hereinabove, in the type of an adsorbent packed therein.

(2) Purification zone

In the purification zone 4, the effluent from the column 2A in the fractionation zone 3 which has undergone selective adsorption of the component A and which thus comprises substantially solely the component B is received by a column 2B.

In the continuous operation where the groups of columns are switched periodically from zone to zone, the column 2B is one which has been used in the fractionation zone for selective adsorption of the component B and the column 2B is filled with a feed of the two-component mixture having undergone selective adsorption of the component B which contains the component A unadsorbed.

Accordingly, when the column 2B in the purification zone receives the effluent from the column 2A in the fractionation zone 3 containing solely the component B, purification of the component B takes place in that the component B in the effluent fed is adsorbed in the column 2B and the component A which has come from the previous stage of the column 2B in question, namely the fractionation zone and contained in the column 2B, is swept off by the remaining of the effluent fed, which thus functions as a purifying fluid, whereby the component of the two-component mixture contained in the column 2B is substantially solely the component B which is adsorbed and the other component, component A, remaining in the column 2B is desorbed.

The similar situation takes place in the column 2A assigned to purification in the purification zone.

Figure 10:
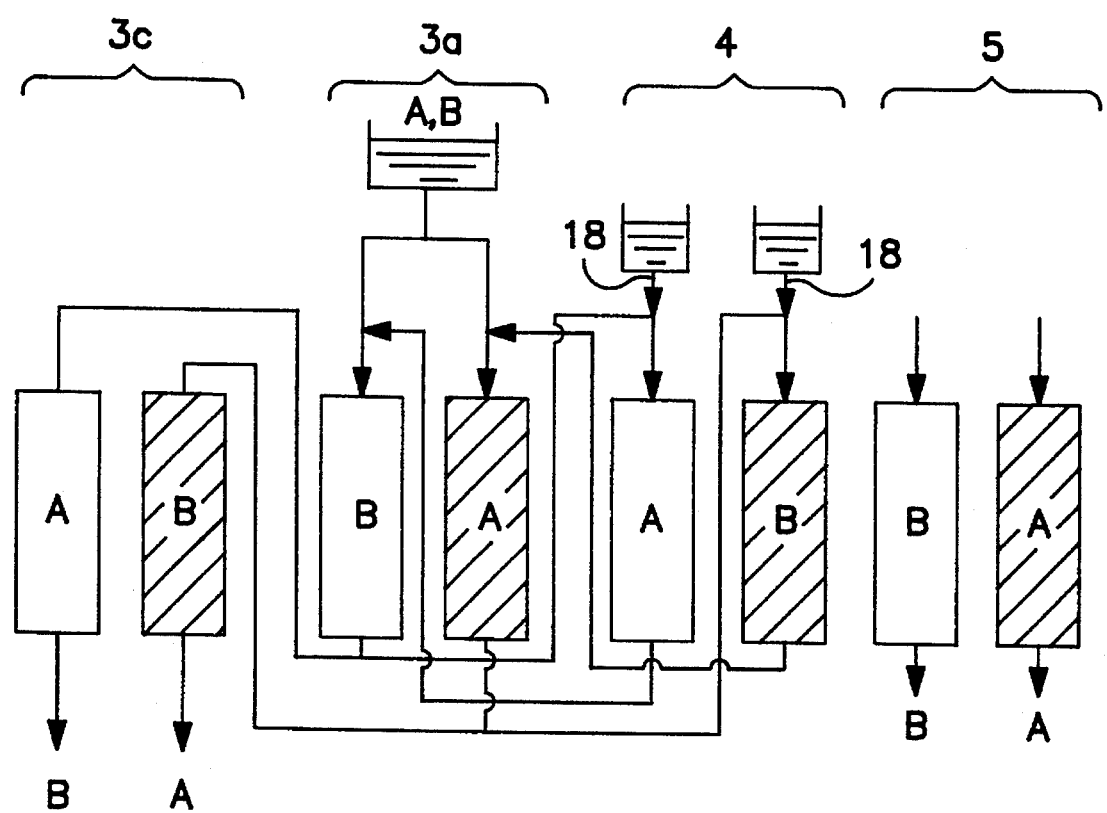
FIG. 10 is a flow diagram indicating another embodiment of the present invention in that arrangement of columns of each group of columns is changed and not only an effluent from the first fractionation zone but also a purifying medium are given to each of columns in the purification zone.

Upon necessity, as shown in FIG. 10, an additional purifying fluid may be fed via tubes 18 to the columns 2A and 2B placed in the purification zone 4.

(3) Desorption zone

The columns 2A and 2B which have, upon the switching, come from the purification zone 4 to the desorption zone and which respectively contain the components A and B so purified respectively receive a desorbent 9 whereby the components A and B adsorbed are respectively desorbed to produce the components separated in a purified state.

(4) Switching of groups of columns from zone to zone

In accordance with one of the important features of the present invention, groups of columns respectively assigned to the principal functions comprising fractionation, purification and desorption in a fractionation zone, a purification zone and a desorption zone, respectively, are periodically switched from zone to zone in that a group of columns once assigned to fractionation, for example, in a fractionation zone is switched from the fractionation zone to a purification zone where the group of columns is assigned to purification.

The timing of the switching is determined so that the step of fractionation is switched just shortly before an effluent from a given column, which is column 2A that selectively adsorbs a component A, starts to contain the component to be adsorbed in the column in question, which is a component A in this example.

The time required until a component A in this particular example starts to appear in the effluent may depend on the amount of the component A in a feed of a multicomponent mixture and/or the capacity of an adsorbent for selectively adsorbs the component A. The capacity of an adsorbent may be increased, when a single column having the desired capacity is not available for the purpose, by the use of a plurality of columns 2A connected in series and/or in parallel.

The switching may be made by moving the groups of columns from zone to zone taking each group as a unit by a mechanical means.

The switching may also be made by a valving means so that flow lines between groups of columns and/or between columns are changed so that the same states of operation as are obtainable by the mechanical moving of the groups of columns are obtained, or by a combination of the mechanical means and the valving means.

FIG. 10 shows another embodiment for separation of two-component mixtures into their two components, where the arrangement of columns 2A and 2B is partly reversed.

Figure 9:
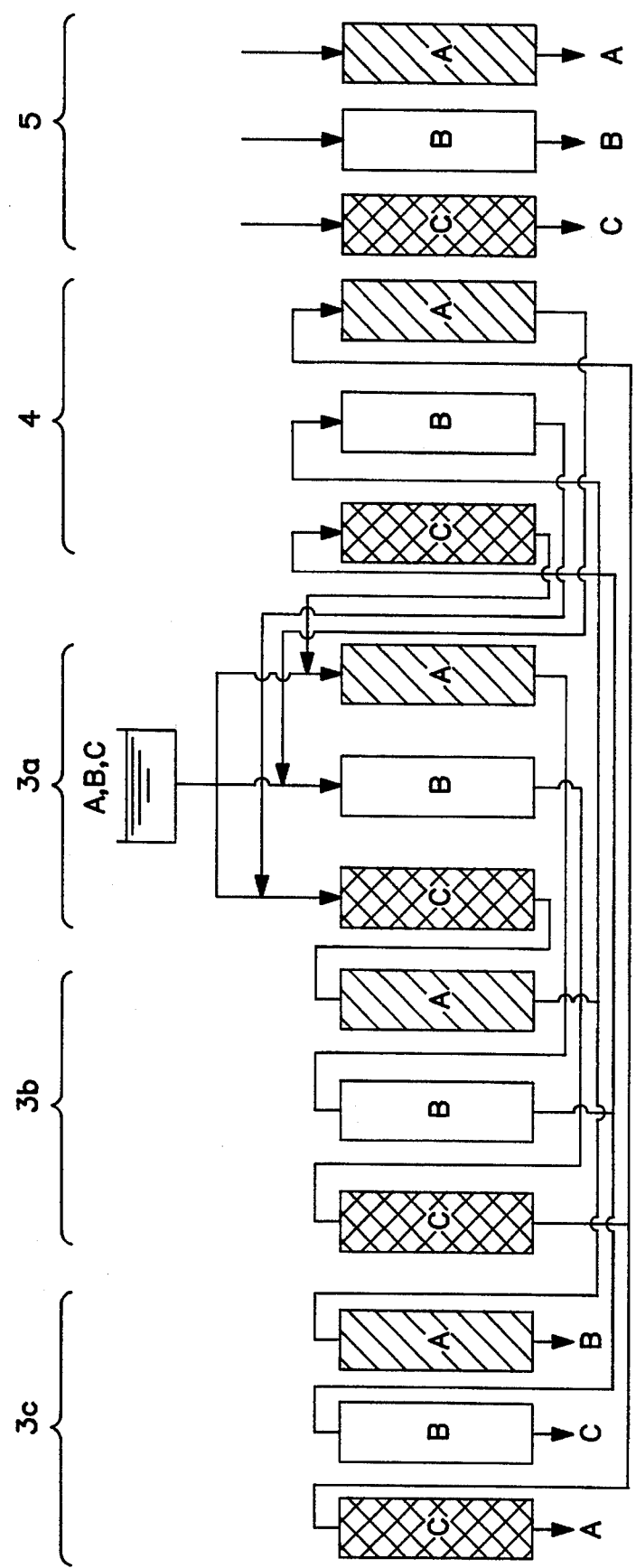
FIG. 9 is a flow diagram for separation of three components in accordance with the present invention where use is made of five groups of columns consisting of a fractionation/recovery zone, a second fractionation zone, a first fractionation zone, a purification zone and a desorption zone, each zone having three columns.

The above description is given mostly to separation of two-components mixtures into the two components. For the separation of three-components mixtures into the three components, it is preferable to use a system set forth in FIG. 9.

EXAMPLE

The present invention will be described in more detail with reference to working examples which are non-limitative.

Example 1

Apparatus

Two cylindrical vessels, each of an inner diameter of 7 mm and a length of 20 mm and having an inlet and an outlet for a fluid at its upper and lower portions were used as a column 2A and a column 2B to form a group of columns, and four of such a group of columns were used in a first fractionation zone 3a, a fractionation/recovery zone 3c, a purification zone 4 and a desorption zone 5 as shown in FIG. 4(1).

Each of the column 2A which was the first column in each of the groups was filled with an ion-excluding resin which selectively adsorbs the component A and each of the column 2B which was the second column in each of the groups was filled with an ion-retarding resin which selectively adsorbs the component B.

Columns are connected as shown in FIG. 4.

More particularly, the groups of columns in the fractionation zone 3, namely the group of columns in the first fractionation zone 3a and the fractionation/recovery zone 3c are connected so that the column 2A's are connected in series by a tube 7a and the column 2B's are connected in series by a tube 7b. The group of columns in the first fractionation zone 3a and the group of columns in the purification zone 4 are connected so that the effluent from the column 2A is sent through a tube 8a in a parallel manner, namely to the column 2B in the purification zone 4 and the effluent from the column 2B in the first fractionation zone 3a is sent through a tube 8b to the column 2A in the purification zone 4. The tubes 8a and 8b can be regarded as branches from the tubes 7a and 7b, respectively.

Tubes for sending effluents from the purification zone 4 to the fractionation zone 3, viz. tubes 17a and 17b, connect the columns so that the effluent from the second column, viz. 2B, in the purification zone 4 is sent back through the tube 17a to the column 2A in the fractionation zone 3a and the effluent from the first column, viz. 2A, in the purification zone 4 is sent back through the tube 17b to the column 2B in the fractionation zone 3.

A desorbent 9 is fed through tubes for feeding a desorbent, 10a and 10b, respectively to the columns 2A and 2B which stand assigned to desorption in the desorption zone 5.

A multicomponent mixture which was an aqueous solution containing glucose and sodium chloride each in concentration of 1% by weight was continuously fed to the group of columns placed in the first fractionation zone 3a so that the first column of the group of columns, column 2A, received the feed in a rate of 2.00 ml/minute and the second column, column 2B, received the feed in a rate of 0.20 ml/minute.

The effluents from the purification were continuously sent back to the first fractionation zone 3a so that the first column, column 2A, received the reflux in a rate of 1.95 ml/minute and the second column, column 2B, received the reflux in a rate of 1.80 ml/minute. The effluents from the purification zone 4, or refluxes, were fed respectively to the columns 2A and 2B in the first fractionation zone 3a in admixture with the feed of the multicomponent mixture.

Flow to the purification zone

The effluents from the columns 2A and 2B in the first fractionation zone 3a were respectively divided into two flows directed toward the purification zone 4 and toward the fractionation/recovery zone 3c, so that a portion of the effluent from the column 2A was sent to the purification zone in a rate of 1.95 ml/min. and the remaining portion thus in a rate of 2.00 ml/min. was sent to the first column in the fractionation/recovery zone 3c viz. column 2A, and a portion of the effluent from the column 2B in the first fractionation zone 3a was sent to the purification zone 4 in a rate of 1.80 ml/min. and the remaining portion thus in a rate of 0.20 ml/min. was sent to the second column in the fractionation/ recovery zone 3c, viz. column 2B.

Since the first column in the first fractionation zone 3a, viz. column 2A adsorbs sodium chloride while it does not adsorb glucose, the effluent from the column 2A was solely an aqueous solution of glucose, and the aqueous solution of glucose upon having been sent to the second column in the purification zone 4, viz. column 2B, which had adsorbed glucose due to the use in the fractionation zone to which it had once been assigned, was used as a purification fluid for the column 2B in the purification zone 4.

Since, on the other hand, the second column in the first fractionation zone 3a adsorbed glucose while it did not adsorb sodium chloride, the effluent from the column 2B was solely an aqueous solution of sodium chloride, which upon having been sent to the first column in the purification zone 4, viz. column 2A, which had adsorbed sodium chloride, was used as a purification fluid for the column 2A in the purification zone 4.

Flow to the fractionation/recovery zone

The portion of the effluent from the column 2A in the fractionation zone 3a sent to the fractionation/recovery zone 3c was an aqueous solution of glucose enriched, and when it was fed to the column 2A in the fractionation/recovery zone 3c which selectively adsorbed sodium chloride, the sodium chloride content was reduced to the minimum level whereby an aqueous solution solely of glucose was obtained from the outlet of the column 2A.

The portion of the effluent from the column 2B in the fractionation zone 3a sent to the fractionation/recovery zone 3c was an aqueous solution of sodium chloride enriched, and it was fed to the column 2B in the fractionation/recovery zone 3c whereby an aqueous solution solely of sodium chloride was to come out from the column 2B.

However, the groups of columns were moved from zone to zone (see the following) before the solution solely of sodium chloride came out from the column 2B, and accordingly only distilled water used as a desorbent (see the following) was recovered from the column 2B at its exit.

Flow in the desorption zone

Distilled water was used as a desorbent and was fed to the first column in the desorption zone, viz. column 2A, in a rate of 6.50 ml/min. and to the second column, viz. column 2B, in a rate of 3.50 ml/min.

From the column 2A in the desorption zone was recovered sodium chloride desorbed and from the column 2B was recovered glucose desorbed.

Moving of groups of columns

The apparatus used was equipped with valves in order to switch fluid flows between the groups of columns from zone to zone as a group of columns being a unit, whereby the groups of columns were switched from zone to zone.

The switching of the groups of columns was made every 2.7 minutes, whereat the group of columns in the first fractionation zone was at the state such that sodium chloride had not come out from the exit of the column 2A and glucose had not come out from the exit of the column 2B, and whereat the group of columns in the purification zone 4 was at the state that the fluid in the column 2A was solely an aqueous solution of sodium chloride and the fluid in the column 2B was solely an aqueous solution of glucose.

The procedures given above were repeated.

Steady state

Upon sequential moving of the group of columns, separation of the components was successfully made in that the components respectively recovered from the column A and column B were independent on time of operation in terms of purities and amounts recovered.

The results obtained are set forth in Table 1 given below.

TABLE 1

| Zone | Column | Purity (% by wt) | Recovery (% by wt) | Product recovered |
| --- | --- | --- | --- | --- |
| Second fractionation | Column 2A | 99.9 | 29.5 | glucose |
| Second fractionation | Column 2B | — | — | distilled water |
| Desorption | Column 2A | 99.8 | 98.7 | sodium chloride |
| Desorption | Column 2B | 99.9 | 70.4 | glucose |

Advantages inherent in the present invention

In accordance with the present invention for separation of components in a multicomponent mixture, use is made of groups of columns such that each group of columns consists columns packed therein an adsorbent in the principle of one column for one type of an adsorbent which selectively adsorbs specific one of the components and further such that at least one group of columns is assigned to fractionation in a fractionation zone where components in a multicomponent mixture are adsorbed respectively onto the respective columns, to purification in a purification zone where the amount of the component adsorbed in a given column is increased and/or the amount of non-adsorbed components in the given column is reduced, and to desorption in a desorption zone where the adsorbed component in a given column is desorbed, wherein the components in the multicomponent mixture are adsorbed in the columns in the group of columns assigned for fractionation, and effluents from columns in another group of columns are utilized as purifying fluid for the adsorbed components, whereby separation of components at higher levels of purity, concentration and recovery efficiency, resulting in reduction in the size of facility for recovery of desorbent which would cover a cost for separation and then in reduction in a cost for separation.

What is claimed is:

1. In a process for separation of a multicomponent mixture into its components comprising subjecting a mixture containing components to be separated in a number of n which is at least two to adsorption thereof onto a solid adsorbent packed in a plurality of columns wherein the difference in the degree of being adsorbed of the components is utilized for the separation and the components adsorbed will then be separately desorbed into respective components, the improvement which comprises the steps of:

introducing the multicomponent mixture containing components to be separated in a number of n which is at least two to a separation means to flow therein which comprises a plurality of the columns divided in at least 3 zones which are (i) a fractionation zone which is for fractionation of the mixture into the respective components adsorbed in the respective columns due to the difference in the degree of being adsorbed of the components, wherein each component adsorbed in a given column is still contaminated with other components staying in said given column, (ii) a purification zone which is for purifying each of the contaminated components respectively adsorbed in the respective columns by introducing into the respective columns a medium for purification which sweeps the contaminant components off in each column while the component to be purified remains adsorbed, and (iii) a desorption zone which is for desorbing the component adsorbed in each column by introducing a desorbent to each column thereby to obtain each component purified out of each respective column;

each zone comprising a unit of columns, the number of columns in the unit being n, which is at least two and is the same as the number of components to be separated in the multicomponent mixture, where each of the columns in each of the zones has an adsorbent packed therein which selectively adsorbs one of the components and wherein each of the columns adsorbs the component selectively adsorbed by the adsorbent packed therein;

the unit of columns assigned to the fractionation being such that the fractionation zone comprises a unit of columns, the number of columns in the unit corresponding to the number of the components to be separated minus unity, n–1 wherein n is at least two and the number of the columns in the unit being n as set forth hereinabove, and the unit of columns at the most upstream position in the plurality of the units receives the multicomponent mixture so that every column in said unit receives the multicomponent mixture so that the respective column has the respective component selectively adsorbed therein and the remaining unit or units of columns is or are connected so that an effluent from each column of an upstream unit of columns is sent separately to a corresponding column a subsequent unit and eventually to the unit of columns at the most downstream position in said zone, the downstream column having an adsorbent packed therein which is different from that used in the upstream column from which the effluent has come, thereby to have the respective columns in the given unit substantially solely one component adsorbed therein and to produce effluents each containing substantially solely one component different from each other of the components in the multicomponent mixture, the remaining components having been adsorbed in the column or columns in the unit or units of columns in said zone through which the multicomponent mixture has been passed;

the unit of columns assigned to the purification being such that the columns are connected with those in the most downstream unit of columns assigned to the fractionation so that an effluent from each column of the most downstream unit of columns in the fractionation zone, which effluent contains substantially solely one of the components, is sent to the column which has an adsorbent packed therein which selectively adsorbs the particular component in the effluent sent thereto whereby the particular component in said effluent is adsorbed in the particular column and said effluent also functions as a purifying fluid for said column in the purification zone so that components in the multicomponent mixture other than that adsorbed in said column are swept thereby and said column in the purification zone has the component selectively adsorbed therein;

the unit of columns assigned to the desorption being such that the columns respectively receive a desorbent specific to an adsorbate in the given column to desorb the adsorbate which is the particular component;

the unit of columns used in the fractionation at the most upstream position in the fractionation zone being assigned, upon substantial fractionation having taken place, to the purification and then, upon substantial purification having taken place, to the desorption while the units of columns used in the purification and in the desorption being sent, upon substantial purification and substantial desorption respectively having taken place, to the desorption and the fractionation at the most downstream position in the fractionation zone, respectively, and then, upon substantial desorption and substantial fractionation respectively having taken place, to the fractionation at the most downstream position in the fractionation zone and purification, respectively;

the change of assignment being carried out either by moving each unit of columns for the fractionation, for purification and for desorption from zone to zone so that each unit of columns receives the assignment in sequence or by switching flow of fluids between columns so that the columns receives the assignment in sequence, whereby a total amount of the units of columns is distributed in the separation means so that (n−1) units are comprised in the fractionation zone and the remaining of the units of columns is comprised in the purification zone;

subjecting the multicomponent mixture introduced in the most upstream unit of columns in the fractionation zone to fractionation wherein the components in the multicomponent mixture are respectively adsorbed in each of the columns and then to subsequent fractionation in each of the columns in a subsequent unit or units of columns in the fractionation zone so that effluents are obtained each of which contains substantially solely one component of components to be separated in the multicomponent mixture, while an effluent from a given column of the most downstream unit of columns for the fractionation is introduced to a column in the purification zone so that said effluent which contains a particular component is introduced to said column in the purification zone which has an adsorbent that selectively adsorbs said particular component so that selective adsorption of said particular component and sweeping contaminant components which remain in said column take place whereby purification of the particular component adsorbed takes place;

assigning the most upstream unit of columns used in the fractionation to the purification; and assigning the unit of columns used in the purification, wherein each of said columns has a respective component adsorbed therein and thus purified, to the desorption wherein a desorbent is introduced to the columns so as to desorb the respective component adsorbed in the columns thereby to obtain said respective component from the columns of the unit of columns used in the desorption.

2. The process as claimed in claim 1, wherein the effluents from the unit of columns assigned to the purification are sent back to the most upstream unit of columns assigned to the fractionation so that an effluent from the given column in the purification zone is sent to a column in the fractionation zone having packed therein an adsorbent which is different from that packed in the given column from which the effluent has come.

3. The process as claimed in claim 1, which further comprises a step wherein effluents from the most downstream unit of columns assigned to the fractionation are sent to an additional unit of columns provided in the fractionation zone of the same nature as the unit or units of columns assigned to the fractionation so that a part of an effluent from a given column in the fractionation zone is sent to the column in the additional unit of columns which has packed therein an adsorbent which is the same as or different from that packed in the column from which the effluent has come whereby the component which has not adsorbed in said column in the additional group of columns is obtained as an effluent from the fractionation zone.

4. The process as claimed in claim 1, wherein the most downstream unit of columns assigned to the fractionation is connected to the unit of columns upstream thereto so that a part of the effluent from a given column in the unit of columns of the most downstream units is divided out and is sent to a column in the upstream unit of columns which has packed therein an adsorbent which is different from that packed in the column from which the effluent has come whereby the effluents from the most downstream unit of columns comprise, in common, one of the components in the multicomponent mixture.

5. The process as claimed in claim 4, wherein the component comprised in common by the effluents from the most downstream unit of columns is a solvent which has made up the multicomponent mixture.

6. The process as claimed in claim 1, wherein the multicomponent mixture comprises two components to be separated.

7. The process as claimed in claim 1, wherein the multicomponent mixture comprises three components to be separated.

8. The process as claimed in claim 1, wherein at least one of the fractionation zone, the purification zone, and the desorption zone further comprises at least one additional unit of columns connected downstream to the unit of columns in said at least one zone.

9. An apparatus for separating a multicomponent mixture into its components in a number of n which is at least two, which comprises:

a plurality of columns divided into at least 3 zones which are a fractionation zone which defines means for fractionation of the mixture into the respective components adsorbed in the respective columns due to the difference in the degree of being adsorbed of the components, a purification zone which defines means for purifying each of the contaminated components respectively adsorbed in each of the columns being connected to a source of a medium for purification which is an effluent from another column containing substantially solely a particular component adsorbed in said column, and a desorption zone which defines means for desorbing the component adsorbed in each of said columns being connected to a source of a desorbent; each zone comprising a unit of columns, the number of the columns in the unit being n which is at least two, which is the same as the number of components to be separated in the multicomponent mixture, where each of the columns has packed therein an adsorbent which selectively adsorbs one of the components whereby each of the columns in each of the zones defines means for adsorbing the component selectively adsorbed by the adsorbent packed therein; the unit of columns assigned to the fractionation being such that the fractionation zone comprises a unit of columns, the number of columns in the unit corresponding to the number of the components to be separated minus unity, n–1 wherein n is at least two and the number of columns in the unit being n as set forth hereinabove, and the unit of columns at the most upstream position in the plurality of the units of columns defines means for receiving the multicomponent mixture and the units of columns in the plurality of the units of columns are connected so that an effluent from each column of an upstream unit of columns is sent separately to a corresponding column in a subsequent unit of the columns, the downstream column having an adsorbent packed therein which is different from that used in the column from which the effluent has come; the unit of columns assigned to the purification being such that the columns are connected with those in the most downstream unit of columns assigned to the fractionation so that an effluent from each column of the fractionation zone is sent to the column which has packed therein an adsorbent which selectively adsorbs the particular component in the effluent sent thereto whereby the particular component in said effluent is adsorbed in the particular column and said effluent also functions as a purifying fluid for said column in the purification zone so that components in the multicomponent mixture other than that adsorbed in said column are swept thereby and said column in the purification zone has the component selectively adsorbed therein; the unit of columns assigned to the desorption being such that the columns respectively are connected to a source of a desorbent specific to an adsorbate in the given column to desorb the adsorbate which is the particular component; means for assigning the unit of columns used in the fractionation, upon substantial fractionation having taken place, to the purification and then, upon substantial purification having taken place, to the desorption and for assigning the units of columns used in the purification and in the desorption, upon substantial purification and substantial desorption respectively having taken place, to the desorption and the fractionation, respectively, and then, upon substantial desorption and substantial fractionation respectively having taken place, to the fractionation and purification, respectively; and means for changing the assignment by moving each unit of columns for the fractionation, for purification and for desorption from zone to zone so that each unit of columns receives the assignment as indicated or by switching flow of fluids between columns so that the columns receives the assignment as indicated.

* * * * *